UNITED STATES PATENT OFFICE.

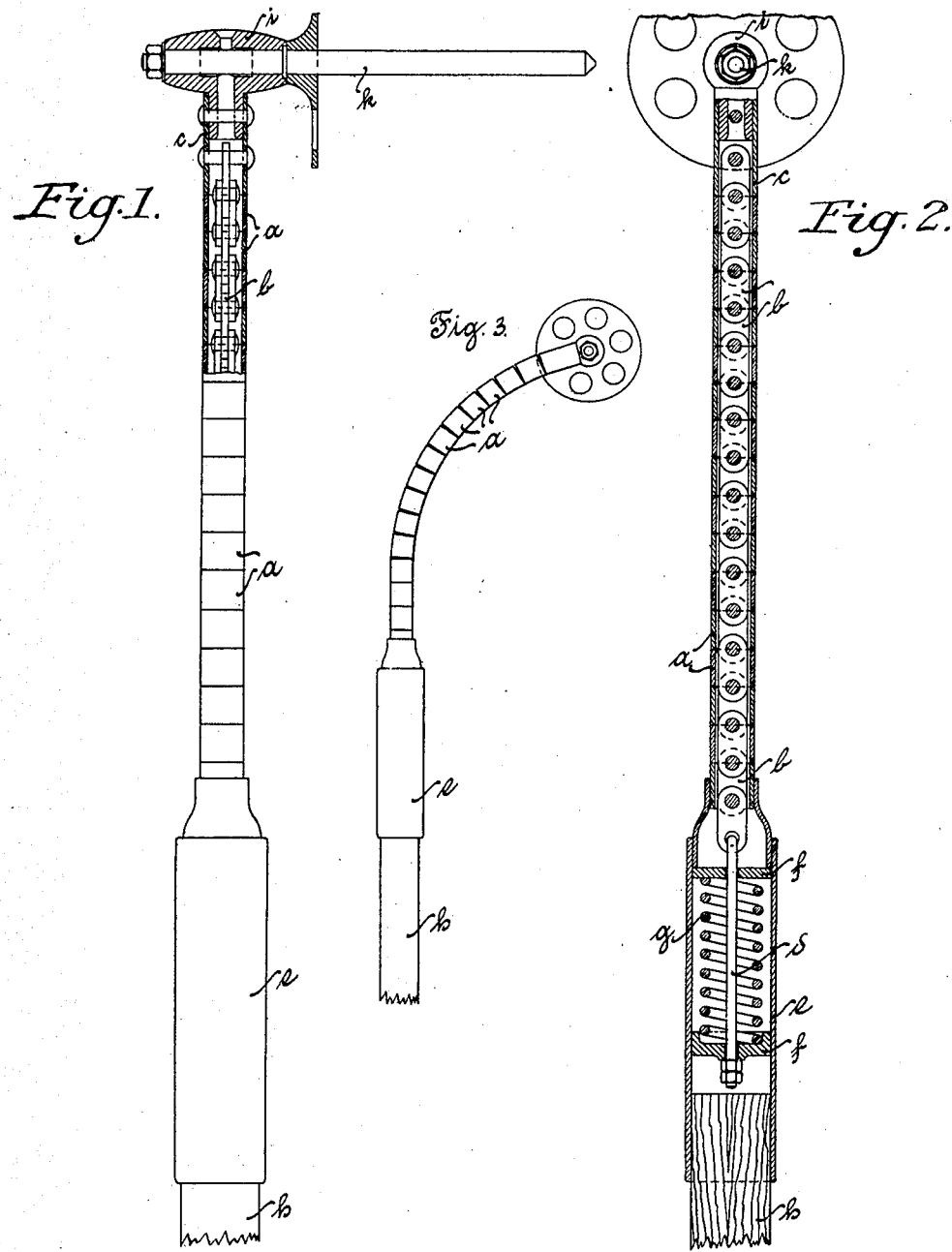

PAUL KARTHAUS, OF HASPE, GERMANY.

BELT-STRIKING DEVICE.

No. 919,437.  Specification of Letters Patent.  Patented April 27, 1909.

Application filed July 29, 1907. Serial No. 386,142.

*To all whom it may concern:*

Be it known that I, PAUL KARTHAUS, a subject of the Emperor of Germany, and a resident of Haspe, Westphalia, Germany, have invented certain new and useful Improvements in Belt-Striking Devices, of which the following is a specification.

This invention relates to a belt striking device by means of which belts may be readily placed on pulleys during the working of the same.

In well known devices for putting on belts which consist either of a rigid bent iron rod or are provided at the top with a hinged arm, shocks are unavoidable, and the putting on of the belts is not therefore quite safe. In accordance with the present invention such shocks are absolutely impossible.

A constructional form of the invention is illustrated in the accompanying drawing, in which, Figure 1 is a side elevation, partly in section, Fig. 2 a longitudinal section, Fig. 3 is an elevation of the device partly broken away, showing how the pipe bends when it comes into contact with a pulley or the spindle.

The device consists of single pieces of tube $a$ of any desired cross-section combined together to form a pipe.

The single pieces $a$ are held together by means of a chain $b$ introduced therein, secured to the uppermost piece $c$ and stretched at the bottom by means of a spring $g$ placed around a tension rod $d$ in the widened pipe portion $e$.

The spring $g$ rests against the disks $f$, the bottom one of which is adjustable.

The pipe $e$ is provided for the purpose of manipulation with a handle $h$.

To the upper piece $c$ is secured a cross piece $i$ in which is rotatably mounted the pin $k$ used for seizing and raising the belt.

The chain $b$ is stretched so tightly that the pipe does not bend when the belt is being raised, but should the said pipe come into contact with the pulley or the spindle, it will bend as shown in Fig. 3, the spring $g$ being compressed and the belt being struck on to the pulley in a reliable manner.

Owing to the increased tension of the spring $g$ the device is again straightened after the belt has been put on.

The bending and the subsequent straightening of the pipe takes place in an extremely gradual manner, without any shock, so that the device can be used even by unskilled laborers in a perfectly safe manner.

Instead of the chain $b$ some other flexible means may be made use of, for instance a cord or the like fitting the cross-section of the pipe.

What I claim as my invention and desire to secure by Letters Patent is:—

1. In a device of the kind described a pipe formed of a plurality of single elements, flexible means within and attached to the uppermost of said elements, a handle, an enlarged tube attaching the lowest of said elements to said handle and a spring within said enlarged tube for applying tension to said flexible means, for the purpose specified.

2. In a device of the kind described a pipe formed of a plurality of single elements, flexible means within and attached to the uppermost of said elements, a handle, an enlarged tube attaching the lowest of said elements to said handle, plates and a spring within said enlarged tube for applying tension to said flexible means, a head upon the last of said elements and at the opposite end to the enlarged tube and means upon said head for engaging a belt, for the purpose specified.

In testimony whereof I have signed my name to this specification in the presence of two subscribing witnesses.

PAUL KARTHAUS.

Witnesses:
  OTTO KÖNIG,
  AUGUST HELLER.